United States Patent [19]

Kidd et al.

[11] Patent Number: 4,566,266
[45] Date of Patent: Jan. 28, 1986

[54] AUTOMATIC TEMPERATURE COMPENSATED FUEL FLOW REGULATION

[75] Inventors: Harry A. Kidd, Shinglehouse, Pa.; Thomas R. Edwards, Hinsdale, N.Y.

[73] Assignee: Dresser Industries, Inc., Dallas, Tex.

[21] Appl. No.: 579,250

[22] Filed: Feb. 13, 1984

[51] Int. Cl.$^4$ ............................ F02C 3/22; F02C 9/28
[52] U.S. Cl. ............................... 60/39.06; 60/39.281; 60/39.465
[58] Field of Search ............. 60/39.06, 39.281, 39.465, 60/39.141

[56] References Cited

U.S. PATENT DOCUMENTS

| | | | |
|---|---|---|---|
| 2,687,273 | 8/1954 | Starkey | 60/39.281 |
| 3,104,524 | 9/1963 | Flanders | 60/39.281 |
| 3,318,090 | 5/1967 | Jubb et al. | 60/39.281 |
| 3,759,037 | 9/1973 | Kiscaden | 60/39.281 |

Primary Examiner—Louis J. Casaregola
Attorney, Agent, or Firm—William R. Peoples

[57] ABSTRACT

This invention relates to a method of achieving a desired fuel/oxygen mass ratio in an internal combustion engine for an existing ambient air temperature comprising of the steps of determining a desired fuel/air differential pressure corresponding to the desired fuel/oxygen mass ratio for said engine at any particular ambient air temperature; and adjusting the fuel flow to said engine to achieve the desired differential fuel/air pressure. The invention also comprises apparatus for achieving a desired fuel/oxygen mass ratio in an internal combustion engine for an existing ambient air temperature comprising means for determining a desired fuel/air differential pressure corresponding to a desired fuel/oxygen mass ratio for said engine at any particular ambient air temperature; and means for adjusting the fuel flow to said engine to achieve the desired fuel/air differential pressure for the existing ambient air temperature.

23 Claims, 3 Drawing Figures

AUTOMATIC TEMPERATURE COMPENSATED FUEL FLOW REGULATION

BACKGROUND OF THE INVENTION

1. Field of the Invention

This invention relates to the regulation of the fuel to oxygen ratio in internal combustion engines. One particularly important practical application of this invention is in the adjustment of the fuel-to-oxygen ratio at startup ignition of the combustion engine. The invention is not intended to be limited to any particular engine and specifically includes engines which burn gaseous fuel and air. An example of one such engine to which the invention relates is a typical gas turbine engine.

2. Description of the Prior Art

While this invention relates in general to engines which burn a mixture of oxygen and fuel in the proper ratio, the particular problems to which this invention is directed are acutely present in a low BTU gas turbine at startup ignition. Some particular problems solved by the invention will therefore be discussed as they relate to a low BTU gas burning turbine engine and, in particular to the startup ignition period of operation.

With particular reference to combustion engines which generate power from the combustion of a gaseous fuel with the oxygen in air, the ratio of fuel mass to oxygen mass which is required for combustion has been approximated by providing a volume of fuel at a fixed pressure through a fixed size inlet nozzle for combustion with a volume of air. The pressure and the nozzle size were fixed so that the amount of fuel injected approximated the amount necessary for proper combustion with the oxygen in the intake air volume. A problem associated with this arrangement is that the mass of oxygen in the air taken into the combustion chamber does not remain constant as various conditions change such as ambient air temperature or pressure. It is understood that by "ambient air temperature or pressure" it is intended to mean the conditions of the inlet air whether from the atmosphere or from a closed supply system. Thus, the amount of fuel which enters into the combustion chamber is not always in the proper ratio with the air to permit efficient combustion. The problem is particularly acute in gas turbine engines which burn low BTU fuel. The inefficient burning caused by the improper fuel/air ratio is particularly noticeable at startup ignition of such engines because startup ignition will not occur unless the ratio of the fuel to air mass is proper. Thus, in such cases not only is the burning efficiency decreased by the improper ratio of fuel to air mass during normal operation but all use of the engine may be prevented because it will not start.

Previous attempts directed toward achieving the proper ratio of the fuel to air mass during the startup ignition period of operation included adjusting the voltage to the ignition spark plugs to attempt to generate enough heat to obtain a startup ignition even when the mixture was not proper. Such attempts have not been successful.

It was further found that a valve in the fuel supply line having a single fixed pressure setting would not provide the proper fuel/air mixture for startup ignition under all variable conditions affecting the oxygen mass content of the ambient air.

The present invention solves the problem of ignition in turbine engines by automatically adjusting the fuel flow valve to cause the proper fuel/air diferential pressure corresponding to the desired fuel/air mass ratio to occur during ignition at any particular ambient air temperature.

SUMMARY OF THE INVENTION

Thus, it is an object of the present invention to provide a method of achieving a desired fuel/oxygen mass ratio in an internal combustion engine for an existing ambient air temperature comprising the steps of determining a desired fuel/air differential pressure corresponding to the desired fuel/oxygen mass ratio for said engine at any particular ambient air temperature and adjusting the fuel flow to said engine to achieve the desired differential fuel/air pressure.

It is also an object of the present invention to provide apparatus for achieving a desired fuel/oxygen mass ratio in an internal combustion engine for an existing ambient air temperature comprising means for determining a desired fuel/air differential pressure corresponding to a desired fuel/oxygen mass ratio for said engine at any particular ambient air temperature and means for adjusting the fuel flow to said engine to achieve the desired fuel/air differential pressure for the existing ambient air temperature.

DESCRIPTION OF THE PREFERRED EMBODIMENTS

The invention refers in general to any internal combustion engine in which oxygen or air containing oxygen and a fuel are burned to produce heat or energy. This invention is particularly useful with a gas turbine of the type having an air inlet, a compressor for receiving air from said inlet, a combustor, a compressed air conduit for carrying compressed air from the compressor to the combustor, a fuel line for carrying gaseous fuel to the combustor, a set of gas turbine blades for converting the energy of combustion into usable power and a means to exhaust the burnt gas and air mixture. The invention will, therefore, be described as it relates to such a gas turbine engine while it will be understood by those skilled in the art that it will be applicable to any fuel and oxygen or air burning engine.

Figure 1:
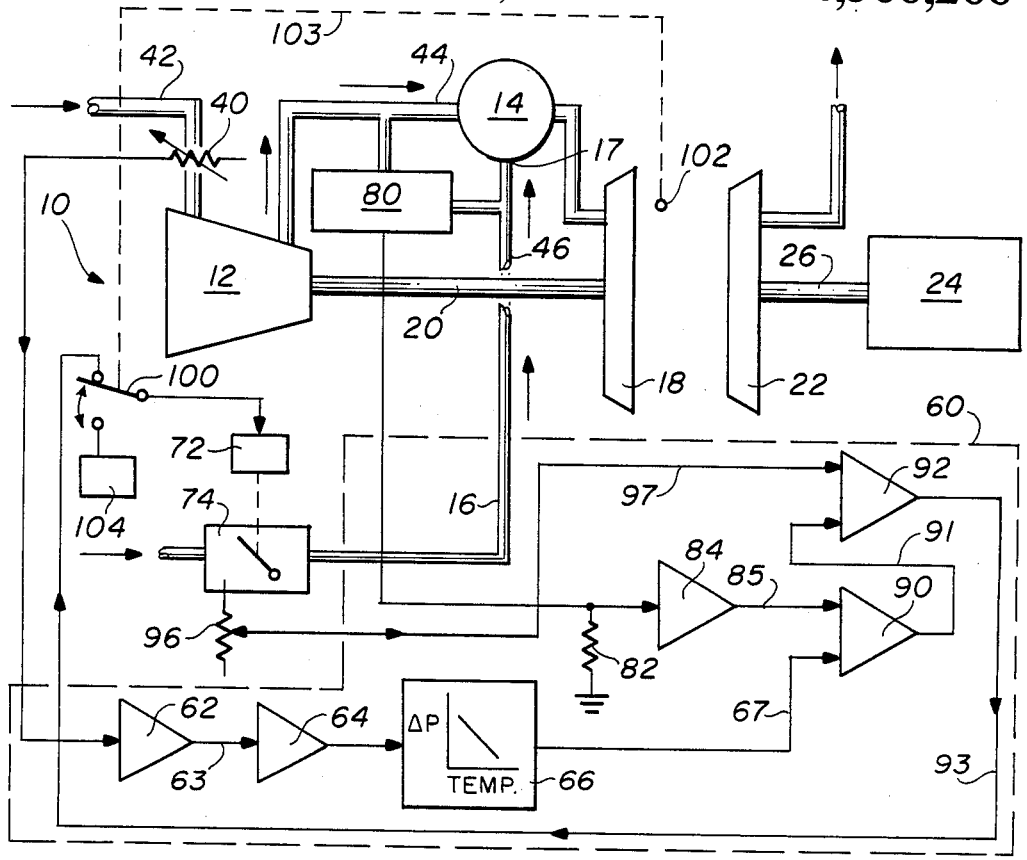
FIG. 1 is a schematic drawing of the inventive fuel flow regulator system shown in one preferred embodiment in conjunction with a particular air and gaseous fuel burning engine.

A gas turbine engine 10 as shown in FIG. 1 receives inlet air at the compressor 12. The air is compressed and conveyed into a combustion chamber or a combustor 14. At the same time fuel is injected under pressure into combustor 14 through fuel line 16. The fuel air mixture is ignited by ignition means, as for example a spark generating means such as a spark plug and the expanding hot burning gas and air mixture is forced over turbine blades 18 and 22 at a high rate of speed thereby driving the compressor through a shaft 20 and providing power to a load 24 through power shaft 26. As long as fuel is supplied combustion continues in the combustor 14 and the compressor 12 continues to intake air, which along with the fuel is provided under pressure into the combustor 14. To initiate this process the compressor must initially be activated by a means for rotating the compressor, such as an electrical starter motor, which rotates the compressor for a short period of time until ignition in the combustion chamber is accomplished.

Under normal circumstances fuel is provided through line 16 at a sufficient rate to permit it to burn in the combustor 14 with the proper amount of oxygen contained in the air being supplied by the compressor 12. However, under certain conditions it has been discovered that, for a given compressor rotation speed (RPM) and a given fuel pressure, ignition cannot be accomplished. This problem is especially acute where low BTU gas is the fuel.

Figure 2:
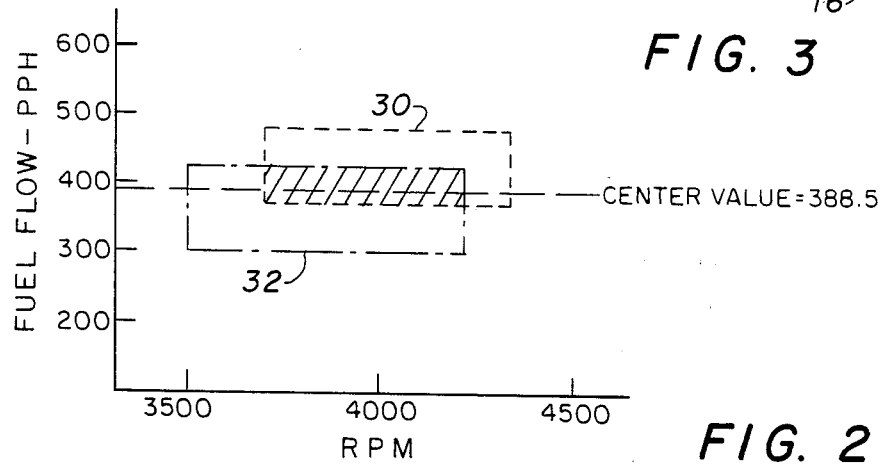
FIG. 2 is a drawing of a graphical representation of fuel to air ratio envelopes for two different engines showing the narrow overlap or common envelope for the two engines.

It has been discovered that for a given engine, at a given site, at a given site ambient air temperature, and a given fuel there is a limited range of compressor RPM and a limited range of fuel flow values for which startup ignition will occur. With reference to FIG. 2 it can be seen that this range defines ignition envelopes 30 and 32, each of which is an example of an envelope for a different gas turbine engine. At a given ambient air temperature the fuel flow provided by the inlet fuel line must be within the narrow range of values and the startup RPM must also be within a limited range. For example, assume the ambient temperature gives an ignition envelope 32 as shown in FIG. 2. Further assume that the starter turns the compressor between 3,500 RPM and 4,200 RPM. Then the fixed fuel pressure in conjunction with the size of the inlet nozzle would have to provide fuel flow at a rate of between 300 and 425 pounds per hour. As can be seen in FIG. 2, if the fuel flow was less than 300 pounds per hour or greater than 425 pounds per hour then ignition would not occur.

An investigation of the ignition problems revealed that repeatable startup ignition could be obtained by maintaining an optimum fuel mass to air ratio at a given ambient air temperature. The validity of this discovery is supportable from the observations that the ignition envelopes in FIG. 2 are dependent both on the fuel flow and the compressor rotation speed and that the amount of air flow into the combustor is proportional to the compressor speed.

It was further determined that the mass of the oxygen in the intake air is dependent upon its temperature. Thus, to maintain a fuel mass to oxygen mass ratio which falls within the ignition envelope at any given ambient air temperature either the volume of air or the volume of fuel entering the combustion chamber must be adjusted. Attempts to vary the RPM and thereby sufficiently adjust the air volume have been unsuccessful.

Increasing the voltage to the spark plugs in the combustor were not effective in obtaining ignition if the fuel to air ratio was not appropriate.

Figure 3:
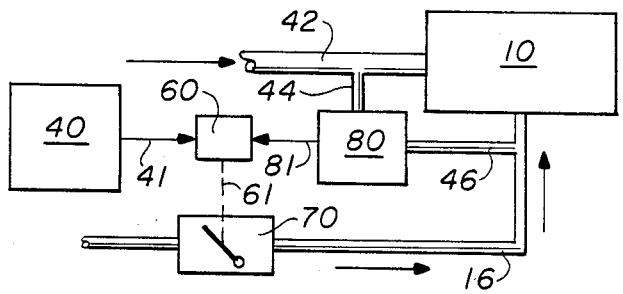
FIG. 3 is a schematic drawing of the inventive fuel flow regulator system.

Reference to FIG. 3 will provide an understanding of the inventive solution to the above indicated problems. The temperature of the ambient inlet air, which is taken in through air intake 42 and drawn into engine 10, is measured by a temperature measuring device 40. The pressure of the inlet air is measured at 44, a point in the inlet air passage immediately preceding entry into the combustion chamber of the engine. Fuel is supplied to engine 10 through fuel line 16 and the pressure in fuel line 16 is measured at 46, a point immediately preceding entry of the fuel into the engine combustion chamber.

The differential pressure between the air pressure measured at 44 and the fuel pressure measured at 46 is determined by pressure measuring device 80 which may be any known means for determining differential pressure such as a differential pressure transducer well known in the art. For example, such as device is built by Gould Statham designated Model PDH 3000. The temperature measurement is converted to a desired fuel/air differential pressure corresponding to the desired fuel/oxygen mass ratio which would cause the proper amount of fuel to enter the combustion chamber for that particular ambient air temperature. The desired differential pressure is compared to the existing measured differential pressure by comparator 60. If the actual existing pressure differential does not correspond to the desired pressure differential then comparator 60 produces a signal on line 61 which causes a fuel valve control means 70 to be driven to a new position so that the pressure in fuel line 16 is adjusted to a pressure which would give the desired fuel/air differential pressure. Thus, a desired fuel mass to air mass ratio is selected at an optimum ratio for the conditions of the ambient air.

The optimum fuel/oxygen mass ratio can be determined experimentally for any particular engine using any particular fuel. Also, the required fuel/air differential pressure values necessary to achieve the desired optimum fuel/oxygen mass ratio at any given temperature and for any particular engine can be determined experimentally and plotted on Cartesian coordinates with the ambient temperature plotted along the "X" axis versus the fuel/air differential pressure plotted along the "Y" axis. This graphical representation has been discovered to produce a curve approximating a linear relationship wherein low ambient air temperature values which indicate high oxygen mass content of the air require a large fuel/air pressure differential so that a greater volume, and thus a greater mass of fuel is injected into the combustor. On the other end of the curve, a high ambient air temperature value requires a low fuel/air differential pressure so that less fuel (i.e. a smaller mass of fuel) is injected into the combustor. With reference to FIG. 1, such a graphical representation is shown schematically inside the conversion amplifier 66, which (as will be discussed more fully later in the specification) is used to convert an electrical signal representing existing ambient air temperature into an electrical signal representing a desired fuel-to-air differential pressure signal.

With reference again to the generalized embodiment of the invention as shown in FIG. 3, an embodiment of the invention is shown wherein the change in oxygen mass in a given volume of air is determined by measuring the inlet ambient air temperature with a temperature detecting signal generating device 40 such as a resistance temperature detector well known in the art as an RTD, other examples include thermocouples or thermistors. For example, a typical device is manufactured by Minco and has 100 ohms resistance at 32° F. with a platinum resistance element. The resistance of the device 40 varies with the temperature.

The differential pressure detector device 80 is connected to the engine to determine the differential pressure between the precombustion air at 44 and the precombustion fuel at 46, which differential pressure device 80 generates the electrical signal on line 81. For example, the differential pressure detecting device may be a transducer 80 which generates the electrical signal.

One such typical device 80 is manufactured by Gould Statham and is designated Model PDH 3000.

The electrical signal output on line 41 of the temperature detector 40 is compared to the electrical signal output on line 81 of the differential pressure detector in a comparator device 60 which generates a control signal on line 61 if the comparison of the inlet air temperature and the existing fuel/air differential pressure indicates that the fuel mass to air mass ratio is not proper. The control signal on line 61 generated by the comparator device 60 activates a fuel pressure adjusting device 70, which as shown in FIG. 1 may be a valve actuator 72 connected to a fuel valve 74 interposed in input fuel line 16. Thus, as the temperature of the air increases the oxygen content per unit volume decreases and the desired fuel/air pressure differential should be decreased so that less fuel is injected into combustor 14 for proper combustion.

As may be further understood with reference to FIG. 1, as the resistance of resistance temperature detector 40 changes the resistance can be converted to a first electrical signal 63 representing ambient air temperature by means of a resistance to voltage conversion device 62, which device may for example be one manufactured by Analog Devices, Part No. ADB 31J. The resulting first electrical signal on line 63 can then be converted to a second electrical signal on line 67 representing a desired fuel/air pressure differential between precombustion air and precombustion fuel corresponding to the desired fuel/oxygen mass ratio for the existing ambient air temperature. This conversion can be accomplished, for example, by the use of scaling amplifiers 64 and 66 as is well known in the art.

The electrical signal from the pressure differential transducer 80 on line 81 representing the actual fuel/air differential pressure can also be converted to a voltage for comparison with the second electrical signal representing the desired fuel/air differential pressure. This may be accomplished by developing a voltage across the resistor 82 which is coupled to a scaling amplifier 84. Thus, the third electrical signal on line 85 from scaling amplifier 84 representing actual fuel/air differential pressure is compared to the second electrical signal on line 67 from scaling amplifier 66 representing the desired fuel/air differential pressure. This comparison may be accomplished with a comparator amplifier 90, well known in the art, which provides a fourth electrical signal on line 91 to an output driver amplifier 92 which produces an electrical signal on line 93 for driving the valve actuator 72 to actuate the valve 74 to the desired position which will enable the proper or desired fuel/air differential pressure to be obtained at combustor 14.

Further to "fine tune" the desired differential pressure, a valve position feed back circuit 96 may be employed to provide a fifth electrical feed back voltage signal on line 97 indicative of the actual position of valve 74. The fifth signal on line 97 may be compared in comparator 92 with the fourth signal on line 91 representing the desired position of the valve 74 to null out valve driving signal 93 when the valve 74 is properly positioned to obtain the desired fuel/air differential pressure between the precombustion air at 44 and the precombustion fuel at 46.

After startup ignition occurs in a particular engine, the fuel/air ratio might not remain a critical factor in the operation of the engine. If that is the case then the inventive fuel flow regulator can be rendered inoperative after ignition. If desired this could be accomplished by switch 100 which is used to break the connection between valve driving signal 93 and fuel valve actuator 72 and to couple valve actuator 72 to fuel governor 104. This can be accomplished automatically by detecting the temperature in combustor 14 with a second temperature detecting device such as a thermocouple at point 102 which provides a signal to move switch 100 by a physical connection 103 when a high combustion temperature such as 500° F. is reached.

It should be noted that this invention also can assist in optimizing fuel consumption during combustion operations by monitoring and corresponding adjusting the fuel feeding to maintain an optimum fuel/air mixture during operations.

This description of the invention is not intended to limit the invention to the particular embodiment enclosed but is intended to encompass all equivalents and subject matter within the spirit and scope of the invention as described above and as claimed in the claims which follow.

What is claimed is:

1. A method of achieving a desired fuel oxygen mass ratio in a gas turbine for an existing ambient air temperature comprising the steps of:
    (a) determining a desired fuel/air differential pressure corresponding to the desired fuel/oxygen mass ratio for said gas turbine at any particular ambient air temperature;
    (b) providing an adjustable fuel flow valve to regulate fuel flow to said gas turbine;
    (c) generating a first electrical signal representing existing ambient air temperature;
    (d) generating a second electrical signal from said first electrical signal representing a desired differential fuel/air pressure corresponding to the desired fuel/oxygen mass ratio for said existing ambient air temperature; and
    (e) automatically adjusting said fuel valve in accordance with said second electrical signal to obtain the desired fuel/air differential pressure.

2. A method as in claim 1 wherein the step of adjusting the fuel flow to said gas turbine further includes the steps of:
    (a) generating a third electrical signal representing the actual fuel/air differential pressure of said gas turbine;
    (b) comparing said second electrical signal representing said desired fuel/air differential pressure at said existing ambient air temperature with said third electrical signal representing said actual fuel/air differential pressure; and
    (c) generating a fourth electrical signal representing a desired fuel valve position for adjusting said fuel valve to vary said fuel flow and cause said actual fuel/air differential pressure to equal said desired fuel/air differential pressure.

3. A method as in claim 2 wherein the step of adjusting the fuel flow to said gas turbine further includes the steps of:
    (a) generating a fifth electrical signal representing actual fuel valve position; and
    (b) comparing said fifth electrical signal representing actual fuel valve position with said fourth electrical signal representing said desired fuel valve position whereby said fuel valve may be driven to said desired position.

4. Apparatus for achieving a desired fuel/oxyen mass ratio in a gas turbine for an existing ambient air temperature comprising:
 (a) means for determining a desired fuel/air differential pressure corresponding to a desired fuel/oxygen mass ratio for said gas turbine at any particular ambient air temperature;
 (b) an adjustable fuel flow valve to regulate fuel flow to said gas turbine;
 (c) means for generating a first electrical signal representing existing ambient air temperature;
 (d) means coupled to said first electrical signal generating means for generating a second electrical signal representing a desired fuel/air differential pressure for said existing ambient air temperature; and
 (e) means coupled to said second electrical signal generating means and said fuel flow valve for automatically adjusting said fuel flow valve in accordance with said second electrical signal to obtain the desired fuel/air differential pressure.

5. Apparatus as in claim 4 wherein said means for adjusting said fuel flow further includes:
 (a) means coupled to said gas turbine for generating a third electrical signal representing the actual fuel/air differential pressure of said gas turbine;
 (b) means receiving and for comparing said second electrical signal representing said desired fuel/air differential pressure at said existing ambient air temperature with said third electrical signal representing said actual fuel/air differential pressure; and
 (c) means coupled to said comparing means and said fuel valve for generating a fourth electrical signal representing a desired fuel valve position and for adjusting said fuel valve to vary said fuel flow and to cause said actual fuel/air differential pressure to equal said desired fuel/air differential pressure.

6. Apparatus as in claim 8 wherein said means for adjusting said fuel flow further includes:
 (a) means coupled to said fuel flow valve for generating a fifth electrical signal representing actual fuel flow valve position; and
 (b) means coupled to said means for generating said fourth signal representing desired fuel flow valve position and to said means for generating said fifth electrical signal representing actual valve position for driving said fuel flow valve to said desired position.

7. In a gas turbine having a fuel intake and a desired fuel/oxygen mass ratio for any particular ambient air temperature, a device for automatically achieving a fuel/air differential pressure corresponding to said desired fuel/oxygen mass ratio for any particular ambient air temperature comprising:
 (a) means for detecting existing ambient air temperature;
 (b) means for detecting actual fuel/air differential pressure;
 (c) adjustable fuel valve means for regulating fuel flow to said fuel intake thereby varying said fuel/air differential pressure; and
 (d) means coupled to said ambient temperature detector, said differential pressure detector, and said adjustable fuel valve means for varying fuel flow to said fuel intake to automatically achieve a fuel/air differential pressure corresponding to said desired fuel/oxygen mass ratio at said existing ambient air temperature.

8. An ignition system for use with a low BTU gas burning turbine, said turbine being of the type having an air inlet, a compressor for supplying compressed air to a combustor, and a fuel line supplying a flow of low BTU gas to said combustor, said ignition system comprising:
 (a) means for generating a signal representing the ambient air temperature;
 (b) means for generating a signal representing the actual gas/air pressure ratio at said combustor;
 (c) means coupled to said temperature measuring means for converting said temperature measurement to a desired value of gas/air differential pressure corresponding to said ambient air temperature;
 (d) means for receiving and comparing said signal representing said actual gas/air differential pressure to said signal representing said desired value of gas/air differential pressure; and
 (e) means coupled to said comparing means for automatically adjusting said fuel line gas flow to achieve said desired gas/air differential pressure.

9. A method of achieving ignition in a gas burning turbine by obtaining a desired fuel/oxygen mass ratio at any particular ambient air temperature comprising the steps of:
 (a) determining a desired fuel/air differential pressure for ignition of said gas turbine at existing ambient air temperature;
 (b) providing an adjustable fuel flow valve to regulate fuel flow to said gas turbine;
 (c) generating a first electrical signal representing existing ambient air temperature;
 (d) generating a second electrical signal from said first electrical signal representing a desired differential fuel/air pressure corresponding to the desired fuel/oxygen mass ratio for said existing ambient air temperature; and
 (e) automatically adjusting said fuel valve in accordance with said second electrical signal to obtain the desired fuel/air differential pressure for proper ignition at the existing ambient air temperature.

10. A method as in claim 9 wherein the step of adjusting the fuel flow to said gas turbine further includes the steps of:
 (a) generating a third electrical signal representing the actual fuel/air differential pressure of said gas turbine;
 (b) comparing said second electrical signal representing said desired fuel/air differential pressure at said existing ambient air temperature with said third electrical signal representing said actual fuel/air differential pressure; and
 (c) generating a fourth electrical signal representing a desired fuel valve position for adjusting said fuel valve to vary said fuel flow and cause said actual fuel/air differential pressure to equal said desired fuel/air differential pressure for proper ignition at the existing ambient air temperature.

11. A method as in claim 10 wherein the step of adjusting the fuel flow to said gas turbine further includes the steps of:
 (a) generating a fifth electrical signal representing actual fuel valve position; and
 (b) comparing said fifth electrical signal representing actual fuel valve position with said fourth electrical signal representing said desired fuel valve position whereby said fuel valve may be driven to said desired position.

12. Apparatus for achieving ignition in a gas burning turbine by obtaining a desired fuel/oxygen mass ratio at any particular ambient air temperature comprising:
   (a) means for determining a desired fuel/air differential pressure corresponding to a desired fuel/oxygen mass ratio for ignition of said gas turbine at any particular ambient air temperature;
   (b) an adjustable fuel flow valve to regulate fuel flow to said gas turbine;
   (c) means for generating a first electrical signal representing existing ambient air temperature;
   (d) means coupled to said first electrical signal generating means for generating a second electrical signal representing a desired fuel/air differential pressure for said existing ambient air temperature; and
   (e) means coupled to said second electrical signal generating means and said fuel flow valve for automatically adjusting said fuel flow valve in accordance with said second electrical signal to obtain the desired fuel/air differential pressure for proper ignition at the existing ambient air temperature.

13. Apparatus as in claim 12 wherein said means for adjusting said fuel flow further includes:
   (a) means coupled to said gas turbine for generating a third electrical signal representing the actual fuel/air differential pressure of said gas turbine;
   (b) means for receiving and comparing said second electrical signal representing said desired fuel/air differential pressure at said existing ambient air temperature with said third electrical signal representing said actual fuel/air differential pressure; and
   (c) means coupled to said comparing means and said fuel valve for generating a fourth electrical signal representing a desired fuel valve position and for adjusting said fuel valve to vary said fuel flow and to cause said actual fuel/air differential pressure to equal said desired fuel/air differential pressure for proper ignition at the existing ambient air temperature.

14. Apparatus as in claim 13 wherein said means for adjusting said fuel flow further includes:
   (a) means coupled to said fuel flow valve for generating a fifth electrical signal representing actual fuel flow valve position; and
   (b) means coupled to said means for generating said fourth signal representing desired fuel flow valve position and to said means for generating said fifth electrical signal representing actual valve position for driving said fuel flow valve to said desired position.

15. A method of improving the operating characteristics at any existing ambient temperature of a gas turbine of the type having air flow and gaseous fuel flow into a combustion chamber, said method comprising the steps of:
   (a) generating a signal representing a desired fuel/air differential pressure for said gas turbine at any particular ambient air temperature; and
   (b) utilizing said generated signal representing said desired fuel/air differential pressure to adjust said fuel flow to achieve said desired differential fuel/air pressure into said combustion chamber.

16. A method as in claim 15 wherein said step of generating a signal representing a desired fuel/air differential pressure comprises the steps of:
   (a) producing a signal representing ambient air temperature; and
   (b) amplifying said produced signal representing ambient air temperature in accordance with an experimentally determined conversion curve of ambient air temperature to desired differential pressure so that said signal is generated which represents said desired fuel/air differential pressure.

17. A method as in claim 16 wherein said step of utilizing said generated signal representing said desired fuel/air differential pressure to adjust fuel flow further comprises the steps of:
   (a) generating a signal representing the actual fuel/air differential pressure at said combustion chambere; and
   (b) comparing said signal representing said actual fuel/air differential pressure to said signal representing said desired fuel/air differential and generating an error signal from said comparison; and
   (c) utilizing said error signal to adjust said fuel supply so that said actual fuel/air differential equals said desired fuel/air differential pressure for said ambient air temperature thereby achieving said desired fuel/air differential pressure.

18. An apparatus for improving the operating characteristics at any existing ambient air temperature of a gas turbine of the type having air flow and gaseous fuel flow into a combustion chamber, said apparatus comprising:
   (a) means for generating a signal representing a desired fuel/air differential pressure for said gas turbine at any particular ambient air temperature;
   (b) means coupled to said signal generating means for utilizing said generated signal representing said desired differential pressure to adjust said fuel flow to achieve said desired differential fuel/air differential pressure into said gas turbine combustion chamber.

19. An apparatus as in claim 18 wherein said means for generating a signal representing a desired fuel/air differential pressure comprises:
   (a) means for producing a signal representing ambient air temperature; and
   (b) means for amplifying said produced signal representing ambient air temperature in accordance with an experimentally determined conversion curve of ambient air temperature to desired differential pressure so that said signal is generated which represents said desired fuel/air differential pressure.

20. A method of improving the start-up ignition chracteristics at any existing ambient temperature of a gas turbine of the type having air flow and gaseous fuel flow into a combustion chamber, said method comprising the steps of:
   (a) generating a signal representing a desired start-up ignition fuel/air differential pressure for said gas turbine at any particular ambient air temperature; and
   (b) utilizing said generated signal representing said desired start-up ignition fuel/air differential pressure to adjust the fuel flow to said gas turbine to achieve said desired differential fuel/air pressure into said combustion chamber.

21. A method as in claim 20 wherein said step of generating a signal representing a desired start-up ignition fuel/air differential pressure comprises the steps of:
   (a) producing a signal representing ambient air temperature; and (b) amplifying said produced signal representing ambient air temperature in accordance with an experimentally determined conversion curve of ambient air temperature to desired start-up ignition fuel/air differential pressure so that said signal is generated which represents said desired fuel/air differential pressure.

22. An apparatus for improving the start-up ignition characteristics at any existing ambient air temperature of a gas turbine of the type having air flow and gaseous fuel flow into a combustion chamber, said apparatus comprising:

(a) means for generating a signal representing a desired start-up ignition fuel/air differential pressure for said gas turbine at any particular ambient air temperature; and (b) means coupled to said signal generating means for utilizing said generated signal representing said desired start-up ignition differential pressure to adjust said fuel flow to achieve said desired start-up ignition fuel/air differential pressure.

23. An apparatus as in claim 22 wherein said means for generating a signal representing a desired start-up ignition fuel/air differential pressure comprises:

(a) means for producing a signal representing ambient air temperature; and (b) means for amplifying said produced signal representing ambient air temperature in accordance with an experimentally determined conversion curve of ambient air temperature to desired fuel/air differential pressure so that said signal is generated which represents said desired start-up ignition fuel/air differential pressure.

* * * * *